HYDROGENATION OF CHLOROTRIFLUORO-ETHYLENE

Charles B. Miller, Morris Plains, John H. Pearson, Glen Rock, and Lee B. Smith, Woodbridge, N. J., assignors to Allied Chemical & Dye Corporation, New York, N. Y., a corporation of New York No Drawing. Application August 8, 1955, Serial No. 527,139

2 Claims. (Cl. 260—653)

This invention is directed to manufacture of $CHF=CF_2$ (B. P. minus 62° C.) from $CClF=CF_2$ (B. P. minus 27° C.). $CHF=CF_2$ is a valuable monomer.

The invention involves catalytic gas-phase reaction of $CClF=CF_2$ with hydrogen. Prior proposals for making $CHF=CF_2$ by reaction of chlorofluorocarbon starting materials and hydrogen have been characterized by use of moderately high reaction temperatures and production of considerable amounts of an unavoidably formed but unwanted by-product, $CH_2FCHF_2$.

A major objective of the present invention is to provide an easily controllable, gas-phase catalytic procedure which may be carried out at markedly low temperatures and which effects high conversion of organic starting material to the $CHF=CF_2$ sought-for product, and greatly minimizes formation of the unwanted $CH_2FCHF_2$ by-product. The invention comprises the selection of a certain chlorofluorocarbon starting material, and the discovery of certain reaction conditions, which factors of starting material and reaction conditions conjunctively lead to the attainment of the foregoing and other objects. The improved process is represented theoretically by

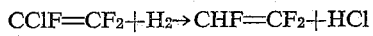

$$CClF=CF_2 + H_2 \rightarrow CHF=CF_2 + HCl$$

which reaction unavoidably effects formation of more or less unwanted $CH_2FCHF_2$ depending upon starting material and reaction conditions employed.

Practice of the invention procedurally comprises passing a gas-phase mixture of $CClF=CF_2$ and hydrogen thru a reaction zone containing a catalyst and maintained at relatively low elevated temperatures, and recovering $CHF=CF_2$ from the reaction zone exit. Apparatus may comprise preferably a tubular reactor, made of stainless steel or other suitable material, mounted in a furnace provided with means for maintaining the catalyst bed in the reactor at a desired elevated temperature. The reactor may include inlets for introduction of controlled amounts of hydrogen and vaporous $CClF=CF_2$, and may be provided with a reaction product exit connected to a conventional purification and product recovery system.

In accordance with the invention it has been found, apart from selection of $CClF=CF_2$ for use as organic starting material, that major process control factors are molecular ratios of hydrogen to $CClF=CF_2$, catalyst composition, and reaction temperatures.

We find that high conversion, as much as 40% by weight and more (single pass), of $CClF=CF_2$ starting material to $CHF=CF_2$, and minimization of formation of unwanted $CH_2FCHF_2$ are largely dependent upon mol ratio of hydrogen to $CClF=CF_2$. Investigations demonstrate that an important control factor in the process lies in regulating molecular proportions of the hydrogen-$CClF=CF_2$ mixture in the reaction zone to substantially in the range of 0.4–1.0 mol of hydrogen to one mol of $CClF=CF_2$. In instances where less than about 0.4 mol of hydrogen is employed per mol of organic starting material, formation of $CHF=CF_2$ falls off undesirably, and on the other hand if hydrogen is employed in quantity significantly in excess of 1.0 mol per mol of $CClF=CF_2$, formation of unwanted $CH_2FCHF_2$ rises to undesirable values. Preferred molecular proportions of hydrogen to $CClF=CF_2$ in the mixture in the reaction zone are substantially in the range of 0.4–0.75 mol of hydrogen per mol of $CClF=CF_2$.

Apparently based mostly upon the particularly suitable characteristics of $CClF=CF_2$ as organic starting material, it has been found that $CHF=CF_2$ may be made from $CClF=CF_2$ by reaction with hydrogen at remarkably low temperatures substantially in the range of 90–175° C. Temperatures below about 90° C. are undesirable since no significant reaction is effected. In most instances, it is preferred to operate at temperatures not less than about 100° C. Temperatures above about 175° C. are desirably avoided, because at higher temperatures production of $CHF=CF_2$ falls off and formation of $CH_2FCHF_2$ increases. We find that this trend becomes notable at about 150° C., and hence preferred operating temperatures lie substantially in the range of 100–150° C.

A further important feature is the nature of the catalytic material employed and the composition thereof. We find that the reaction is particularly well promoted by use of a palladium on activated carbon catalyst. Such catalyst may be made by conventional methods, for example by stirring a solution of palladium chloride in water or ether with activated carbon of e. g. 8 x 14 mesh. Solvent may then be removed by vacuum evaporation at room temperature followed by drying in vacuum at about 200° C. The palladium chloride may be reduced to metallic palladium in the usual way, for example by reducing by hydrogen in situ.

The material employed in accordance with the invention is a palladium on activated carbon catalyst which may contain as much as 10% by weight of palladium. As hereinafter exemplified, the preferred catalyst is palladium on activated carbon, portions of palladium to activated carbon being such that the catalyst contains preferably about 0.5% to not more than about 7% by weight of palladium. In this range palladium content does not appear to be particularly critical. Contact times of incremental portions of reactants in the reaction zone may lie in the range of 5 to 25 seconds, preferably 5 to 20 seconds.

Under foregoing described reaction conditions, even at very low temperatures or at high temperatures and high hydrogen to organic ratios, the invention affords the advantages of conversion of more than 25% by weight of fed organic to $CHF=CF_2$, and formation of a reaction zone exit which contains, with regard to the quantity of $CClF=CF_2$ starting material which has reacted, more than twice as much $CHF=CF_2$ as $CH_2FCHF_2$, that is, of the starting material which has reacted, twice as much or more of fed organic starting material goes to $CHF=CF_2$ rather than to $CH_2FCHF_2$. In the better embodiments, in which we regulate molecular proportions of the hydrogen-$CClF=CF_2$ mixture to substantially in the range of 0.4–0.75 mol of hydrogen to one mol of $CClF=CF_2$, and heat the mixture at temperature substantially in the range of 100–150° C., while in the presence of palladium on activated carbon catalyst containing about 0.5–7.0% by weight of palladium, we are enabled to effect conversions of $CClF=CF_2$ to $CHF=CF_2$ up to 40% and better (single pass), and to effect production of from about four to ten times as much $CHF=CF_2$ as $CH_2FCHF_2$.

Products of reaction and unreacted organic starting material may be recovered and isolated by conventional methods. For example, the reactor exit may be passed thru water to remove the bulk of the HCl, and then thru an aqueous solution of sodium hydroxide to remove last traces of acid. The gaseous exit of the sodium hydroxide scrubber may be dried by means of calcium chloride. The dried gas stream then may be run thru a cold trap, cooled by a mixture of Dry-Ice and acetone, to condense the organics and separate same from unreacted hydrogen. Unreacted organic starting material, $CHF=CF_2$, and $CH_2FCHF_2$ may be separated and recovered from the cold trap condensate by fractional distillation.

The following examples illustrate practice of the invention:

*Example 1.*—A 0.5 inch I. P. S. nickel reactor about 36 inches long, containing about 90 ml. of catalyst occupying about 19–20 inches of the center part of the reactor, was placed in an electric tube furnace which was heated so as to maintain the catalyst bed during the run substantially in the temperature range of 130–135° C. The catalyst was palladium on activated carbon (Columbia carbon, grade 6G, 8 x 14 mesh) and contained about 5% by weight of palladium. $CClF=CF_2$ (B. P. minus 27° C.) was vaporized and fed into the reactor at a rate of about 0.9 mol per hour, and hydrogen was simultaneously introduced at the rate of about 0.45 mol per hour. Mol ratio of $H_2$ to organic reactant was about 0.5/1, and contact time was about 10 seconds. The reactor exit was passed thru water to remove the bulk of the HCl, and thereafter thru an aqueous solution of sodium hydroxide to remove last traces of acid. Gaseous exit of the sodium hydroxide scrubber was passed thru a calcium chloride desiccant. The dried gas stream was then passed thru a cold trap, cooled by a mixture of Dry-Ice and acetone, to condense the organics and separate the same from unreacted hydrogen. Upon fractional distillation of the cold trap condensate, materials were isolated and recovered as follows. 0.391 mol $CHF=CF_2$ (B. P. minus 62° C.), 0.071 mol $CH_2FCHF_2$ (B. P. 5° C.), and 0.854 mol of unreacted $CClF=CF_2$. These quantities represented 28.9% of the fed organic material converted to $CHF=CF_2$ and 5.3% to $CH_2FCHF_2$. Overall recovery of organic material was 97.4%, and hydrogen utilization was 78.8%.

The following examples, unless otherwise indicated were carried out procedurally substantially the same as noted in Example 1:

*Example 2.*—The catalyst bed was maintained at a temperature substantially in the range of 120–137° C., and the catalyst was palladium on activated carbon and containing about 5% by weight of palladium. $CClF=CF_2$ was vaporized and fed into the reactor at a rate of about 0.5 mol/hr. The hydrogen was simultaneously introduced at a rate of 0.25 mol/hr. Mol ratio of $H_2$ to organic reactant was about 0.5/1, and contact time was about 18 seconds. The reactor exit was treated as in Example 1, and upon fractional distillation of the cold trap condensate, materials were isolated and recovered as follows: 0.354 mol of $CHF=CF_2$, 0.036 mol of $CH_2FCHF_2$, and 0.820 mol of unreacted $CClF=CF2$. These quantities represented 28.3% of the fed organic material converted to $CHF=CF_2$ and 2.9% to $CH_2FCHF_2$. Overall recovery of organic material was 96.7%, and hydrogen utilization was 68.1%.

*Example 3.*—The catalyst bed was maintained at a temperature of about 125° C. and the catalyst was palladium on activated carbon and contained about 0.75% by weight of palladium. $CClF=CF_2$ was vaporized and fed into the reactor at a rate of about 0.9 mol/hr. The hydrogen was simultaneously introduced at a rate of 0.45 mol/hr. Mol ratio of $H_2$ to organic reactant was about 0.5/1, and contact time was about 10 seconds. The reactor exit was treated as in Example 1, and upon fractional distillation of the cold trap condensate, materials were isolated and recovered as follows: 0.597 mol of $CHF=CF_2$, 0.072 mol of $CH_2FCHF_2$, and 0.896 mol of unreacted $CClF=CF_2$. These quantities represented 33.2% of the fed organic material converted to $CHF=CF_2$ and 4.0% to $CH_2FCHF_2$. Overall recovery of organic material was 87.0%, and hydrogen utilization was 82.4%.

*Example 4.*—The catalyst bed was maintained at a temperature substantially in the range of 96–100° C., and the catalyst was palladium on activated carbon and contained about 5% by weight of palladium. $CClF=CF_2$ was vaporized and fed into the reactor at a rate of about 0.9 mol/hr. The hydrogen was simultaneously introduced at a rate of 0.45 mol/hr. Mol ratio of $H_2$ to organic reactant was about 0.5/1, and contact time was about 10 seconds. The reactor exit was treated as in Example 1, and upon fractional distillation of the cold trap condensate, materials were isolated and recovered as follows: 0.342 mol of $CHF=CF_2$, 0.083 mol of $CH_2FCHF_2$, and 0.862 mol of unreacted $CClF=CF_2$. These quantities represented 25.3% of the fed organic material converted to $CHF=CF_2$ and 6.2% to $CH_2FCHF_2$. Overall recovery of organic material was 95.4%, and hydrogen utilization was 75.2%.

*Example 5.*—The catalyst bed was maintained at a temperature substantially in the range of 96–101° C., and the catalyst was palladium on activated carbon and contained about 5% by weight of palladium. $CClF=CF_2$ was vaporized and fed into the reactor at a rate of about 0.5 mol/hr. The hydrogen was simultaneously introduced at a rate of 0.35 mol/hr. Mol ratio of $H_2$ to organic reactant was about 0.7/1, and contact time was about 15 seconds. The reactor exit was treated as in Example 1, and upon fractional distillation of the cold trap condensate, materials were isolated and recovered as follows: 0.44 mol of $CHF=CF_2$, 0.167 mol of $CH_2FCHF_2$, and 0.672 mol of unreacted $CClF=CF_2$. These quantities represented 35.2% of the fed organic material converted to $CHF=CF_2$ and 13.3% to $CH_2FCHF_2$. Overall recovery of organic material was close to 100%, and hydrogen utilization was 88.0%.

*Example 6.*—The catalyst bed was maintained at a temperature substantially in the range of 140–158° C., and the catalyst was palladium on activated carbon and contained about 5% by weight of palladium. $CClF=CF_2$ was vaporized and fed into the reactor at a rate of about 0.9 mol/hr. The hydrogen was simultaneously introduced at a rate of 0.9 mol/hr. Mol ratio of $H_2$ to organic reactant was about 1/1, and contact time was about 7 seconds. The reactor exit was treated as in Example 1, and upon fractional distillation of the cold trap condensate, materials were isolated and recovered as follows: 0.574 mol of $CHF=CF_2$, 0.274 mol of $CH_2FCHF_2$, and 0.422 mol of unreacted $CClF=CF_2$. These quantities represented 42.5% of the fed organic material converted to $CHF=CF_2$ and 20.2% to $CH_2FCHF_2$. Overall recovery of organic material was 93.9%, and hydrogen utilization was 82.9%.

*Example 7.*—The catalyst bed was maintained at a temperature substantially in the range of 100–112° C., and the catalyst was palladium on activated carbon and contained about 5% by weight of palladium. $CClF=CF_2$ was vaporized and fed into the reactor at a rate of about 0.5 mol/hr. The hydrogen was simultaneously introduced at a rate of 0.32 mol/hr. Mol ratio of $H_2$ to organic reactant was about 0.64/1 and contact time was about 15 seconds. The reactor exit was treated as in Example 1, and upon fractional distillation of the cold trap condensate, materials were isolated and recovered as follows: 0.488 mol of $CHF=CF_2$, 0.107 mol of $CH_2FCHF_2$, and 0.646 mol of unreacted $CClF=CF_2$. These quantities represented 39% of the fed organic material converted to $CHF=CF_2$ and 8.6% to $CH_2FCHF_2$. Overall recovery of organic material was 99.3%, and hydrogen utilization was 79.9%.

*Example 8.*—The catalyst bed was maintained at a temperature of about 141° C., and the catalyst was palladium on activated carbon and contained about 3% by weight of palladium. $CClF=CF_2$ was vaporized and fed into the reactor at a rate of about 0.9 mol/hr. The hydrogen was simultaneously introduced at a rate of 0.45 mol/hr. Mol ratio of $H_2$ to organic reactant was about 0.5/1, and contact time was about 10 seconds. The reactor exit was treated as in Example 1, and upon fractional distillation of the cold trap condensate, materials were isolated and recovered as follows: 0.585 mol of $CHF=CF_2$, 0.107 mol of $CH_2FCHF_2$, and 1.051 mols of unreacted $CClF=CF_2$. These quantities represented 32.5 of the fed organic material converted to $CHF=CF_2$ and 6% to $CH_2FCHF_2$. Overall recovery of organic material was 97%, and hydrogen utilization was 91.7%.

We claim:

1. The process for making $CHF=CF_2$ from $CClF=CF_2$ which comprises introducing hydrogen and $CClF=CF_2$ into a reaction zone, regulating molecular proportions of the hydrogen-$CClF=CF_2$ mixture in the reaction zone to substantially in the range of 0.4–0.75 mol of hydrogen to one mol of $CClF=CF_2$, heating said mixture at temperature substantially in the range of 90–150° C. while in the presence of a palladium on activated carbon catalyst, and recovering $CHF=CF_2$ from the resulting reaction products.

2. The process for making $CHF=CF_2$ from $CClF=CF_2$ which comprises introducing hydrogen and $CClF=CF_2$ into a reaction zone, regulating molecular proportions of the hydrogen-$CClF=CF_2$ mixture in the reaction zone to substantially in the range of 0.4–0.75 mol hydrogen of one mol of $CClF=CF_2$, heating said mixture at temperature substantially in the range of 100–150° C. while in the presence of a palladium on activated carbon catalyst containing not more than about 7% by weight of palladium; and recovering $CHF=CF_2$ from the resulting reaction products.

References Cited in the file of this patent

UNITED STATES PATENTS

| | | |
|---|---|---|
| 2,685,606 | Clark | Aug. 3, 1954 |
| 2,704,775 | Clark | Mar. 22, 1955 |
| 2,704,777 | Clark | Mar. 22, 1955 |

FOREIGN PATENTS

| | | |
|---|---|---|
| 698,386 | Great Britain | Oct. 22, 1953 |